United States Patent
Kou et al.

(10) Patent No.: US 10,482,034 B2
(45) Date of Patent: Nov. 19, 2019

(54) REMOTE ATTESTATION MODEL FOR SECURE MEMORY APPLICATIONS

(71) Applicant: Microsoft Technology Licensing, LLC, Redmond, WA (US)

(72) Inventors: Lei Kou, Redmond, WA (US); Pushkar Vijay Chitnis, Bellevue, WA (US); Simon Leet, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 15/364,044

(22) Filed: Nov. 29, 2016

(65) Prior Publication Data
US 2018/0150411 A1 May 31, 2018

(51) Int. Cl.
*H04L 29/06* (2006.01)
*G06F 12/14* (2006.01)
*G06F 21/57* (2013.01)

(52) U.S. Cl.
CPC .......... *G06F 12/1408* (2013.01); *G06F 21/57* (2013.01); *H04L 63/0807* (2013.01); *H04L 63/123* (2013.01); *G06F 2212/1052* (2013.01)

(58) Field of Classification Search
CPC ................ G06F 12/1408; G06F 21/57; G06F 2212/1052; H04L 63/123; H04L 63/0807
See application file for complete search history.

(56) References Cited

U.S. PATENT DOCUMENTS

| | | | | |
|---|---|---|---|---|
| 6,704,871 B1 * | 3/2004 | Kaplan | ................... | G06F 21/72 713/192 |
| 8,327,441 B2 * | 12/2012 | Kumar | ..................... | G06F 21/57 726/22 |
| 8,375,221 B1 * | 2/2013 | Thom | ...................... | G06F 21/57 713/189 |
| 8,738,932 B2 * | 5/2014 | Lee | .......................... | G06F 21/72 713/190 |

(Continued)

OTHER PUBLICATIONS

Yoshihama et al., WS-Attestation: Efficient and Fine-Grained Remote Attestation on Web Services, IEEE ICWS 2005.*
Anati et al., Innovative Technology for CPU Based Attestation and Sealing, Intel, Aug. 2013.*
Patrick Koeberl et al., TrustLite: A Security Architecture for Tiny Embedded Devices, ACM, Apr. 2014.*

(Continued)

*Primary Examiner* — David Garcia Cervetti
(74) *Attorney, Agent, or Firm* — Workman Nydegger

(57) ABSTRACT

Instantiating an attestation facilitation component that allows a remote application to attest to a secure state of a secure memory application executing upon a secure platform of a computer system regardless of a type of either the secure platform or a health attestation service. Instantiation comprises identifying a property that includes at least one of the secure platform type and the health attestation service type. The instantiation is customized with the identified property. The attestation facilitation component verifies that a report generated by the secure platform represents that the secure memory application is operating in a secure state, and accesses a token generated by the health attestation service that represents that the secure platform is operating in a secure state. The attestation facilitation component gener- (Continued)

ates a quote that allows the remote application to verify that the secure platform and the secure memory application are both operating in secure states.

20 Claims, 3 Drawing Sheets

(56) References Cited

U.S. PATENT DOCUMENTS

| | | | | |
|---|---|---|---|---|
| 8,782,435 B1* | 7/2014 | Ghose | G06F 9/3851 | 713/190 |
| 8,782,752 B1* | 7/2014 | Juels | H04L 67/1097 | 370/235 |
| 8,839,363 B2* | 9/2014 | Spiers | H04L 63/0218 | 726/3 |
| 8,966,249 B2* | 2/2015 | Lindteigen | H04L 63/1441 | 713/156 |
| 8,972,732 B2* | 3/2015 | Kotla | H04L 9/0866 | 713/171 |
| 9,087,196 B2* | 7/2015 | Wood | G06F 21/57 | |
| 9,342,696 B2* | 5/2016 | Imtiaz | G06F 21/575 | |
| 9,411,962 B2* | 8/2016 | Attfield | G06F 21/51 | |
| 9,491,111 B1* | 11/2016 | Roth | H04L 63/0428 | |
| 9,578,017 B2* | 2/2017 | Ferguson | H04L 63/0823 | |
| 9,619,238 B2* | 4/2017 | Potlapally | G06F 9/4401 | |
| 9,659,177 B1* | 5/2017 | Juels | G06F 21/575 | |
| 9,686,077 B2* | 6/2017 | Raj | H04L 67/1095 | |
| 9,767,284 B2* | 9/2017 | Ghose | G06F 9/3877 | |
| 9,906,493 B1* | 2/2018 | Rodgers | H04L 63/0281 | |
| 9,998,438 B2* | 6/2018 | Sinha | G06F 21/44 | |
| 10,019,601 B2* | 7/2018 | Scarlata | G06F 21/62 | |
| 10,049,202 B1* | 8/2018 | Johansson | G06F 3/04841 | |
| 10,050,787 B1* | 8/2018 | Johansson | H04L 63/08 | |
| 10,176,095 B2* | 1/2019 | Ferguson | H04L 63/0428 | |
| 2003/0177390 A1* | 9/2003 | Radhakrishnan | H04L 63/0209 | 726/12 |
| 2003/0196111 A1* | 10/2003 | Lampson | G06F 9/4406 | 726/34 |
| 2004/0064457 A1* | 4/2004 | Zimmer | G06F 21/575 | |
| 2004/0243811 A1* | 12/2004 | Frisch | H04L 9/3297 | 713/176 |
| 2005/0033980 A1* | 2/2005 | Willman | G06F 21/57 | 726/26 |
| 2005/0120219 A1* | 6/2005 | Munetoh | G06F 21/52 | 713/176 |
| 2005/0132031 A1* | 6/2005 | Sailer | G06F 21/577 | 709/223 |
| 2005/0132202 A1* | 6/2005 | Dillaway | H04L 9/0825 | 713/179 |
| 2005/0138384 A1* | 6/2005 | Brickell | G06F 21/57 | 713/182 |
| 2005/0149729 A1* | 7/2005 | Zimmer | G06F 21/575 | 713/168 |
| 2005/0223221 A1* | 10/2005 | Proudler | G06F 21/57 | 713/164 |
| 2005/0251857 A1* | 11/2005 | Schunter | G06F 21/57 | 726/16 |
| 2006/0015719 A1* | 1/2006 | Herbert | G06F 21/305 | 713/164 |
| 2006/0026423 A1* | 2/2006 | Bangerter | H04L 9/3218 | 713/164 |
| 2006/0200680 A1* | 9/2006 | Ellison | G06F 12/1491 | 713/190 |
| 2008/0046752 A1* | 2/2008 | Berger | H04L 9/3271 | 713/186 |
| 2008/0216172 A1* | 9/2008 | Forman | G06F 21/33 | 726/21 |
| 2008/0256595 A1* | 10/2008 | Schunter | G06F 21/57 | 726/1 |
| 2008/0307223 A1* | 12/2008 | Brickell | H04L 63/126 | 713/158 |
| 2009/0086979 A1* | 4/2009 | Brutch | H04L 9/0836 | 380/279 |
| 2009/0169012 A1* | 7/2009 | Smith | G06F 21/57 | 380/277 |
| 2009/0178138 A1* | 7/2009 | Weiss | G06F 21/577 | 726/22 |
| 2009/0193509 A1* | 7/2009 | Cardone | G06F 21/33 | 726/9 |
| 2009/0204964 A1* | 8/2009 | Foley | G06F 21/53 | 718/1 |
| 2009/0319793 A1* | 12/2009 | Zic | G06F 21/34 | 713/172 |
| 2010/0031047 A1* | 2/2010 | Coker, II | H04L 63/0281 | 713/176 |
| 2010/0082984 A1* | 4/2010 | Ellison | G06F 21/57 | 713/170 |
| 2010/0121928 A1* | 5/2010 | Leonard | H04L 63/1433 | 709/206 |
| 2010/0161998 A1* | 6/2010 | Chen | G06F 21/57 | 713/189 |
| 2010/0306076 A1* | 12/2010 | Taveau | G06Q 20/02 | 705/26.8 |
| 2010/0306107 A1* | 12/2010 | Nahari | G06Q 20/02 | 705/44 |
| 2011/0087887 A1* | 4/2011 | Luft | H04L 9/3247 | 713/178 |
| 2011/0131627 A1* | 6/2011 | Abendroth | G06F 21/41 | 726/1 |
| 2011/0173643 A1* | 7/2011 | Nicolson | G06F 21/575 | 719/328 |
| 2011/0179477 A1* | 7/2011 | Starnes | G06F 21/52 | 726/9 |
| 2011/0202992 A1* | 8/2011 | Xiao | G06F 21/33 | 726/10 |
| 2011/0213953 A1* | 9/2011 | Challener | G06F 21/57 | 713/2 |
| 2011/0320823 A1* | 12/2011 | Saroiu | G06F 21/53 | 713/189 |
| 2012/0089830 A1* | 4/2012 | Kande | G06F 21/645 | 713/155 |
| 2012/0204020 A1* | 8/2012 | Novak | H04L 63/1433 | 713/2 |
| 2012/0216244 A1* | 8/2012 | Kumar | G06F 21/31 | 726/1 |
| 2013/0151846 A1* | 6/2013 | Baumann | H04L 9/3263 | 713/156 |
| 2013/0159726 A1* | 6/2013 | McKeen | G06F 21/72 | 713/189 |
| 2013/0198797 A1* | 8/2013 | Raghuram | G06F 21/57 | 726/1 |
| 2014/0020073 A1* | 1/2014 | Ronda | G06F 21/31 | 726/7 |
| 2014/0090075 A1* | 3/2014 | Verma | G06F 21/10 | 726/26 |
| 2014/0096182 A1* | 4/2014 | Smith | H04L 9/0872 | 726/1 |
| 2014/0109191 A1* | 4/2014 | Raghuram | H04L 67/1097 | 726/4 |
| 2014/0115659 A1* | 4/2014 | Attfield | G06F 21/51 | 726/1 |
| 2014/0122873 A1* | 5/2014 | Deutsch | H04L 63/20 | 713/158 |
| 2014/0337277 A1* | 11/2014 | Asenjo | G06Q 10/06 | 707/603 |
| 2015/0082024 A1* | 3/2015 | Smith | H04L 63/0428 | 713/155 |
| 2015/0082048 A1* | 3/2015 | Ferguson | G06F 21/602 | 713/189 |
| 2015/0188944 A1* | 7/2015 | Dyer | H04L 63/20 | 726/3 |
| 2015/0261950 A1* | 9/2015 | Schulz | G06F 21/51 | 726/22 |
| 2015/0294313 A1* | 10/2015 | Kamal | G06Q 20/401 | 705/44 |
| 2015/0302398 A1* | 10/2015 | Desai | G06F 8/60 | 705/41 |

(56) References Cited

U.S. PATENT DOCUMENTS

| | | | | |
|---|---|---|---|---|
| 2015/0319160 | A1* | 11/2015 | Ferguson | H04L 63/0428 726/10 |
| 2015/0365436 | A1* | 12/2015 | Shenefiel | H04L 63/20 726/1 |
| 2016/0027399 | A1* | 1/2016 | Wilde | G06F 13/382 345/520 |
| 2016/0085955 | A1* | 3/2016 | Lerner | G06F 21/31 726/20 |
| 2016/0098283 | A1* | 4/2016 | Martinez | G06F 9/44505 713/2 |
| 2016/0142212 | A1* | 5/2016 | Sarangdhar | H04L 9/0861 713/156 |
| 2016/0246736 | A1* | 8/2016 | Lee | G06F 21/72 |
| 2016/0275461 | A1* | 9/2016 | Sprague | G06Q 20/0655 |
| 2016/0371496 | A1* | 12/2016 | Sell | G06F 9/45558 |
| 2017/0257365 | A1* | 9/2017 | Gonzalez | H04L 63/20 |
| 2017/0302459 | A1* | 10/2017 | Fenner | H04L 9/0819 |
| 2017/0353319 | A1* | 12/2017 | Scarlata | G06F 21/53 |
| 2017/0364685 | A1* | 12/2017 | Shah | G06F 21/53 |
| 2017/0366359 | A1* | 12/2017 | Scarlata | H04L 9/0816 |
| 2018/0114000 | A1* | 4/2018 | Taylor | G06F 21/12 |
| 2018/0114012 | A1* | 4/2018 | Sood | G06F 21/53 |
| 2019/0087586 | A1* | 3/2019 | McKeen | G06F 21/72 |
| 2019/0138729 | A1* | 5/2019 | Blundell | G06F 11/16 |
| 2019/0220625 | A1* | 7/2019 | Durham | G06F 21/71 |

OTHER PUBLICATIONS

Toqeer Ali Syed et al., Providing Efficient, Scalable and Privacy Preserved Verification Mechanism in Remote Attestation, ICICTM, May 2016.*

A. Francillon, K. Rasmussen, Q. Nguyen, and G. Tsudik. Systematic treatment of remote attestation. In Cryptology ePrint Archive: Report 2012/713, 2012.*

Liang Gu et al., Remote Attestation on Program Execution, ACM, Oct. 2008.*

Gopalan, et al., "Policy driven Remote Attestation", In Proceedings of International Conference on Security and Privacy in Mobile Information and Communication Systems, May 2011, pp. 1-12.

Huang, et al., "An Effective Approach for Remote Attestation in Trusted Computing", In Proceedings of the International Symposium on Web Information Systems and Applications, May 22, 2009, pp. 80-83.

Jain, et al., "Security Analysis of Remote Attestation", In CS259 Project Report, Retrieved on: Aug. 25, 2016, 8 pages.

Drake, et al., "Android Hacker's Handbook", Retrieved from <<https://repo.zenk-security.com/Magazine%20E-book/Android%20Hacker%27s%20Handbook.pdf>>, Jan. 1, 2014, 577 Pages (p. 9, p. 11, p. 18, p. 20).

Coker et al., "Principles of Remote Attestation", In Journal of Information Security, vol. 10, Issue 2, Apr. 23, 2011, pp. 63-81.

"International Search Report and Written Opinion Issued in PCT Application No. PCT/US2017/062661", dated Feb. 15, 2018, 13 Pages.

* cited by examiner

REMOTE ATTESTATION MODEL FOR SECURE MEMORY APPLICATIONS

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data.

While these networks allow for great ease in transmitting and receiving electronic data, such networks also allow for great ease in the transmitting and receiving of computer viruses and other malicious code. As such, the ability to ensure that a computer system is healthy and secure is increasingly important. Accordingly, numerous ways to ensure the security of a computer system have been developed. For instance, new technologies have been developed that attempt to secure application against inspection and tampering at the operating system level. Such technologies may allow applications to execute in a region of memory that is isolated from the rest of the operating system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to instantiating an attestation facilitation component that allows an application that is remote from the computer system to attest to a secure state of a secure memory application (SMA) executing upon a secure platform of the computer system regardless of a type of the secure platform and a type of a health attestation service. For example, embodiments may include instantiating an attestation facilitation component. The instantiation comprises identifying at least one property that includes at least one of (i) the type of the secure platform from a plurality of different types of secure platforms and (ii) the type of the health attestation service from a plurality of different types of health attestation services. Embodiments may further include customizing the instantiation with the at least one identified property.

The customized instance of the attestation facilitation component may then perform a number of actions, including verifying that a report generated by the secure platform represents that the SMA is operating in a secure state. Additionally, the attestation facilitation component may access a token generated by the health attestation service. The generated token represents that the secure platform is operating in a secure state. Furthermore, the attestation facilitation component may generate a quote that can be used by the remote application to verify that the secure platform and the SMA are both operating in secure states. The quote is based on at least a portion of the generated report and a portion of the generated token.

Accordingly, a class of quoting SMA's may be customized based on the type of the secure platform and/or the type of health attestation service. Such a customized class of quoting SMA's may allow target SMA's and remote applications to utilize multiple different types of secure platforms and/or health attestation services instead of having to code different target SMA's and challenger applications for each particular type of secure platform and/or health attestation service. Additionally, such a class of customizable quoting SMA's may allow utilization of multiple types of health attestation services with a particular type of secure platform, as well as utilization of multiple types of a secure platform with a particular type of health attestation service. Accordingly, upon customization, an instantiated quoting SMA may be able to utilize each of the trust protocols used by the identified secure platform and/or identified health attestation service to bind the trust that the challenger application has in the health attestation service to trust in the generated quote, the secure platform, the report, and ultimately the target SMA.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
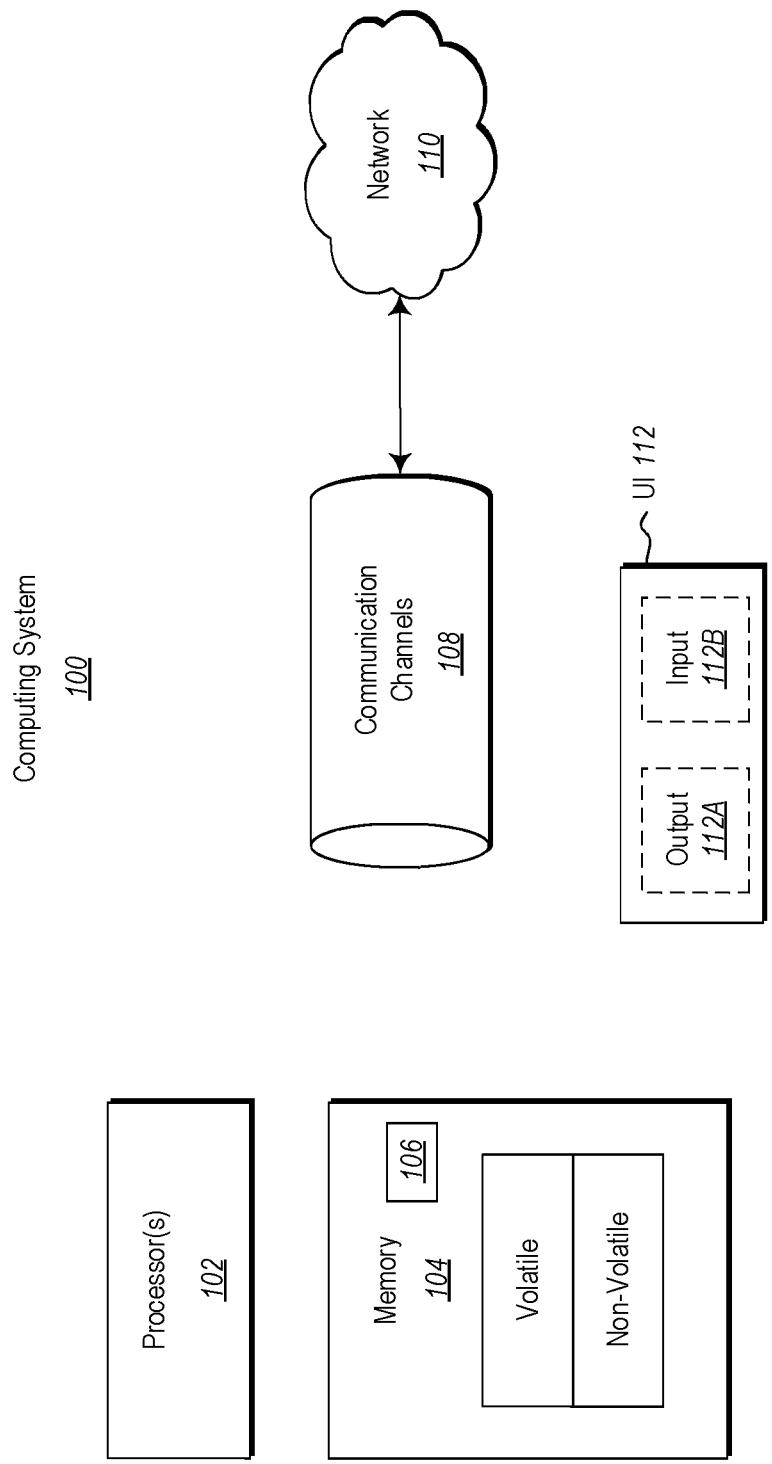
FIG. 1 illustrates an example computer architecture that facilitates operation of the principles described herein.

At least some embodiments described herein relate to instantiating an attestation facilitation component that allows an application that is remote from the computer system to attest to a secure state of a secure memory application (SMA) executing upon a secure platform of the computer system regardless of a type of the secure platform and a type of a health attestation service. For example, embodiments may include instantiating an attestation facilitation component. The instantiation comprises identifying at least one property that includes at least one of (i) the type of the secure platform from a plurality of different types of secure platforms and (ii) the type of the health attestation service from a plurality of different types of health attestation services. Embodiments may further include customizing the instantiation with the at least one identified property.

The customized instance of the attestation facilitation component may then perform a number of actions, including verifying that a report generated by the secure platform represents that the SMA is operating in a secure state. Additionally, the attestation facilitation component may access a token generated by the health attestation service. The generated token represents that the secure platform is operating in a secure state. Furthermore, the attestation facilitation component may generate a quote that can be used by the remote application to verify that the secure platform and the SMA are both operating in secure states. The quote is based on at least a portion of the generated report and a portion of the generated token.

Accordingly, a class of quoting SMA's may be customized based on the type of the secure platform and/or the type of health attestation service. Such a customized class of quoting SMA's may allow target SMA's and remote applications to utilize multiple different types of secure platforms and/or health attestation services instead of having to code different target SMA's and challenger applications for each particular type of secure platform and/or health attestation service. Additionally, such a class of customizable quoting SMA's may allow utilization of multiple types of health attestation services with a particular type of secure platform, as well as utilization of multiple types of a secure platform with a particular type of health attestation service. Accordingly, upon customization, an instantiated quoting SMA may be able to utilize each of the trust protocols used by the identified secure platform and/or identified health attestation service to bind the trust that the challenger application has in the health attestation service to trust in the generated quote, the secure platform, the report, and ultimately the target SMA.

Some introductory discussion of a computing system will be described with respect to FIG. 1. Then performing remote attestation of a secure memory application executing upon a secure platform of a computer system regardless of a type of the secure platform and a type of a health attestation service will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
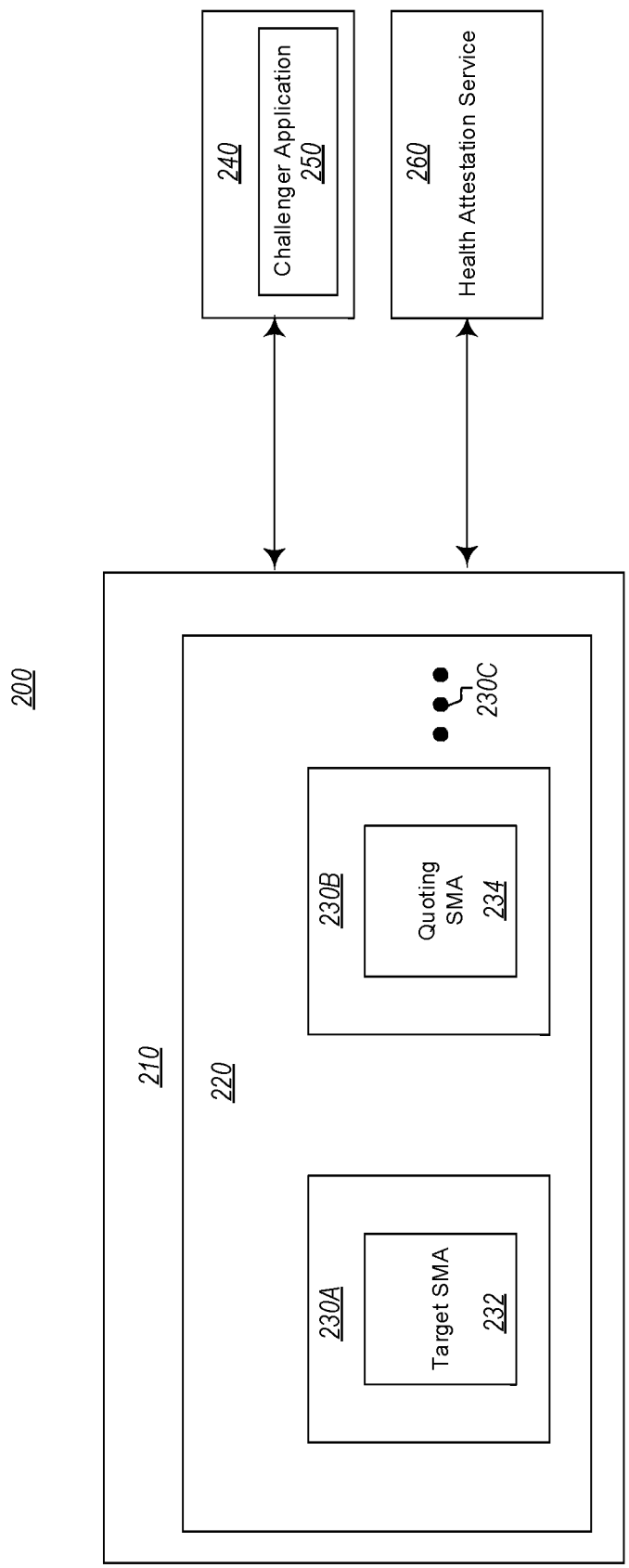
FIG. 2 illustrates an example environment of that provides for remote attestation of a secure memory application executing within a secure platform of a computer system.

FIG. 2 illustrates an example environment 200 that provides for remote attestation by a challenger application 250 as to the integrity (i.e., a secure or healthy state) of a secure memory application (SMA) executing within a secure memory portion (e.g., secure memory portion 230A, secure memory portion 230B, and so forth) of a secure platform 220 that is included within computer system 210. FIG. 2 includes computer system 210 and computer system 240 that each may comprise any type of computer system now existing or to be developed in the future. For instance, either or both of computer system 210 and computer system 240 may comprise computer system 100, as described with respect to FIG. 1. In another example, computer system 210 and computer system 240 may comprise a desktop computer, laptop computer, smartphone, tablet, smartwatch, and so forth. Additionally, such a computer system may use any type of desktop or mobile operating system (e.g., MICROSOFT® WINDOWS®, APPLE® OS XX, APPLE IOS®, GOOGLE™ CHROME OS™, GOOGLE ANDROID™, and so forth).

As illustrated, computer system 210 includes secure platform 220. Secure platform 220 may comprise all entities/components (i.e., hardware and/or software) of computer system 210 that are operating in a verifiably secure state. For instance, the secure platform 220 may comprise a trusted computing base of the computer system 210. Notably, secure platform 220 may be isolated from the rest of an operating system (and/or other components) of the computer system 210. As such, any part of the operating system that is excluded from secure platform 220 may be referred to as being an insecure portion of the operating system. Secure platform 220 may be hardware-based (e.g., INTEL® Software Guard Extensions (INTEL SGX)), software/hypervisor-based (e.g., MICROSOFT Virtual Secure Mode (MICROSOFT VSM)), or any combination of hardware and software. With respect to hardware-based embodiments of the secure platform 220, the insecure portion of the operating system may comprise the entire operating system. In an example, secure platform 220 may include a secure kernel and one or more secure memory portions (e.g., secure memory portion 230A and secure memory portion 230B), as described further herein. Accordingly, the secure platform 220 may include a number of secure memory regions/portions for secure execution of executable code, as illustrated by secure memory portion 230A and secure memory portion 230B (note that secure memory portion 230A and secure memory portion 230B may also be known as enclaves). While only two secure memory portions are shown in FIG. 2, ellipses 230C represents that any number of secure memory portions may be included within memory of secure platform 220.

As shown, computer system 210 also includes target SMA 232 that is executing with secure memory portion 230A and quoting SMA 234 (also referred to herein as an attestation facilitation component) that is executing within the secure memory portion 230B. While only two SMA's are shown in FIG. 2, there may be any number of SMA's executing within secure memory portions of secure platform 220. Additionally, while the target SMA 232 and the quoting SMA 234 are shown as executing within different secure memory portions of secure platform 220, SMA's may also execute in the same secure memory portion.

In general, an SMA may comprise any code that is executing within a secure memory portion of a secure platform (e.g., secure memory portion 230A and secure memory portion 230B). Additionally, the trusted computing base of any SMA executing within a secure memory portion of the secure platform 220 may be limited to the secure platform itself. In other words, the only entity that is critical to the security of an SMA comprises the secure platform 220. As such, an author of an SMA may be able to trust that the SMA's code and data will remain private and protected even in the event of the insecure portion (e.g., the operating system) of a computer system on which the SMA is executing becoming compromised. Notably, target SMA 232 and quoting SMA 234, are described more fully herein.

As illustrated, FIG. 2 includes a challenger application 250 (also referred to as the remote application herein) that may be executing on computer system 240. Challenger application 250 may comprise any type of application executing within computer system 240. For example, the challenger application 250 may comprise a secure application executing within a secure memory portion of a secure platform of computer system 230. The challenger application may request to perform remote attestation as to the security of a particular SMA executing within the secure platform 220 of computer system 210. For instance, the challenger application 250 may request to attest to the security of target SMA 232. In a specific example, the target SMA 232 may own a private key that the challenger application 250 desires to use to encrypt particular data. As such, the challenger application may verify that both the secure platform 220 and the target SMA 232 are indeed secure before trusting the target SMA to provide a valid private key.

Before the remote challenger application 250 can attest to the security of target SMA 232, an attestation service 260 may first attest to the security of secure platform 220. Accordingly, health attestation service 260 may comprise a service or an entity that can attest to the security of a secure platform. For instance, various measurements (e.g., measurements relating to identified hardware, identified software, current state of particular hardware components, current state of particular software applications/components, and so forth) that define a current state of the secure platform 220 may first be securely captured. These measurements may then be sent to attestation service 260. The attestation service may then verify that the received measurements match an expected secure state of the secure platform. In other words, the attestation service may ensure that the measurements show that the secure platform is currently in an expected healthy state. In a specific example, health attestation service 260 may validate health properties of a trusted platform module (TPM) log of a particular secure platform against a particular health policy of the particular secure platform.

Successful attestation of the security of the secure platform 220 may result in a secure verification generated by the attestation service that can later be used as proof for the challenger application 250 that the secure platform is indeed secure, as described more fully herein. Accordingly, regardless of the implementation described herein, the challenger application may have implicit trust in the health attestation service used. In an example, successful attestation of the security of secure platform 220 may result in the attestation service creating a secure token that can later be used to sign a secure artifact (also referred to herein as a quote) to be sent to the challenger application 250 for remote attestation, as further described herein. Such a secure token (or secure verification) may be considered to be secure for a number of reasons, including that any insecure portion of computer system 210 cannot access, or tamper with, the secure token. As such, the secure token may be stored at computer system 210, as described more fully herein. Additionally, any secrets (e.g., secrets associated with a signing key) associated with such secure tokens are generally only accessible by quoting SMA's (e.g., quoting SMA 234, as further described herein) rather than any general SMA executing with secure platform 220.

In a more specific example, the secure token may include a signing key that can later be used to sign a quote created in response to verifying that the target SMA 232 is healthy. Alternatively, the secure token may be used to access a signing key. The signing key may then allow the challenger application 250 to verify the validity of the signing key using a public component of the signing key that the challenger application knows (i.e., the challenger application can cryptographically verify the validity of the signing key because the public component has been publicly distributed). In another example, a shared secret may be associated with the secure token. In such cases, the challenger application may know the shared secret, while quoting SMA 234 may only gain access to the secret when the health attestation service has attested to a healthy secure platform 220 (i.e., by generating the secure token). The quoting SMA may then use that shared secret as part of a quote to be attested to by the challenger application 250, as further discussed herein.

While these are a few examples of how the trust of the challenger application can be placed in the quoting SMA 234 (and therefore the quote), any number of other implementations may be used, including but not limited to the use of shared secrets, symmetric keys, asymmetric keys, and so forth. As such, the verification (e.g., a secure token) generated by the attestation service 260 may then be stored on the computer system 210 or the attestation service 260. Notably, while the verification is also referred to as a secure token herein, the verification may comprise any appropriate verification of the security of the secure platform 220.

The attestation of the secure platform 220 may occur before any SMA begins executing on a secure memory portion of the secure platform. Furthermore, attestation to the security of the secure platform 220 by the attestation service 260 may occur asynchronously in relation to the challenger application 250 requesting to attest to a particular SMA (e.g., target SMA 232). In other words, the attestation service 260 may perform attestation to the security of secure platform 220 regardless of whether a challenger application is requesting (or has requested) to remotely attest to a particular SMA. In other embodiments, attestation to the security of the secure platform 220 by the attestation service 260 may occur in response to the challenger application 250 requesting to attest to a particular SMA.

Once attestation by the attestation service 260 of the secure platform 220 has occurred, one or more SMA's may begin executing within a secure memory portion of the secure platform. As such, challenger application 250 may request to attest to the security of a particular SMA. For example, the challenger application 250 may request to attest to the security of target SMA 232. Upon receiving such an indication from challenger application 250, a local attestation of the security of target SMA 232 may be performed by the secure platform 220. Such local attestation may include verification that the target SMA 232 is currently in an expected state (i.e., secure state). Similar to the attestation of the secure platform by the health attestation service, verification of the security of the target SMA may include capturing various measurements of the current state (i.e., security, health) of the target SMA and verifying that the captured measurements match an expected secure state of the target SMA.

In some embodiments, the local attestation of target SMA 232 may be performed by another SMA that is executing within secure platform 220. The ability to perform such local attestation may be provided by any secure platform 220 regardless of a type of the particular secure platform. For example, hardware-based INTEL SGX and software-based MICROSOFT VSM may both allow for performance of such local attestation. Local attestation of the target SMA 232 may result in the creation of a report by the secure platform 220 (or an entity executing within the secure platform that is acting as a proxy for the secure platform) that represents that the state of target SMA 232 has been verified as currently being secure (i.e., operating within a secure state). Such a report may include any appropriate measurements associated with the target SMA that were captured and analyzed during the local attestation of the target SMA. Additionally, the report may be signed by the secure platform, which signature may later be verified by the challenger application.

Once the report has been created, quoting SMA 234 may verify that the report resulting from the local attestation of the target SMA 232 is valid. In an example, the quoting SMA 234 may also use the local attestation provided by the secure platform to locally attest to the target SMA 232 as part of verifying the integrity of the created report. After verification of the report that the target SMA 232 is indeed healthy, the quoting SMA 234 may use both the report and the verification (e.g., secure token) that was previously provided by the attestation service (i.e., provided in response to attestation of the health of the secure platform 220) to create a quote (i.e., secure artifact) that can be verified, or attested to, by the challenger application 250.

Accordingly, the quote may include all measurements from the report that are critical for the challenger application to attest to the security of the target SMA 232. In some embodiments, the entire report may be included within the quote. Furthermore, the secure token (i.e., verification) may be used by the quoting SMA 234 to sign the created quote as a proxy for the attestation service 260 when the quoting SMA 234 has been able to verify the health of the target SMA 232. While using the secure token to sign the quote is one example of using the secure token to create the quote, the secure token may be used in any number of ways with respect to the quote to represent to the challenger application that the health attestation service has in fact attested to the health of the secure platform.

Using the secure token (which may only be generated in response to the secure platform 220 being found healthy by the attestation service 260) to create the quote essentially guarantees to the challenger application 250 both that the secure platform is healthy and that the report (or portions of the report) included with the signed quote can therefore be trusted. In other words, because the challenger application trusts the health attestation service, the challenger application will trust that the secure token used to create the quote guarantees that the secure platform is in a secure state.

Additionally, because the challenger application trusts that the secure platform is secure, the challenger application will also trust that the report included within the quote is an accurate representation of the current state of the target SMA 232 (i.e., a healthy secure platform would not generate a false report of the target SMA). Accordingly, once the challenger application 250 has received the quote, the challenger application may verify that the secure token generated by the health attestation service was used to create the quote. Additionally, the challenger application may analyze the report included within the quote to verify both that the target SMA 232 is currently operating in a secure state and that the target SMA is indeed the SMA to which the challenger application wanted to remotely attest.

Notably, in general today, each particular type of secure platform (e.g., INTEL SGX, MICROSOFT VSM, and so forth) has been tied to one particular type of health attestation service, one particular type of quoting SMA, and a particular method for chaining trust from the health attestation service's verification of the security of the secure platform (e.g., the health attestation service providing a secure token that includes a signing key that can be accessed to sign a quote when the health attestation service has verified that the secure platform is healthy). Additionally, the challenger application and any SMA's have generally had to be coded specifically for a particular type of secure platform, as well as the particular protocols used by the particular secure platform to bind trust in the health attestation service used to the report (i.e., how trust was bound from the health attestation service to the quote such that the challenger application trusts in the security of both the secure platform and the report of the target SMA). Accordingly, in such instances, using a different health attestation service to attest to a particular secure platform may not have been possible. Furthermore, in such instances, challenger applications and SMA's may not have been able to function across multiple types of secure platforms and/or multiple types of health attestation services.

To overcome some of these issues, a quoting SMA class may be created that allows a challenger application to attest to SMA's running on multiple types of secure platforms, as well as to use multiple types of health attestation services that bind the challenger application's trust in the health attestation service to trust in the quote, the report, the secure platform, and ultimately the target SMA. As such, the quoting SMA class may include one or more properties relating to at least one of a particular type of secure platform (e.g., INTEL SGX, MICROSOFT VSM, and so forth) and a particular type of health attestation service. Accordingly, instantiation of a quoting SMA may include identifying either or both of the type of secure platform and the type of the health attestation service. Once those properties have been identified, the instantiation of a quoting SMA may include customizing the quoting SMA with the identified properties (i.e., customizing the quoting SMA to be used with the particular secure platform and/or health attestation service selected). Accordingly, an instance of such a quoting SMA class may have access to the verification (e.g., a secure token) of the health attestation service that secure platform is healthy, and may further be capable of creating a quote based on the verification and a generated report regarding a state of the target SMA.

As such, the quoting SMA class may allow a challenger application to choose either or both of the type of secure platform and the type of the health attestation service upon instantiation of a particular quoting SMA. Additionally, by choosing the type of secure platform and/or the type of health attestation service may also effectively allow the challenger application to choose the protocols used to bind trust from the chosen health attestation service to the quote, the report, the secure platform, and ultimately the target SMA (i.e., shared secrets, asymmetric keys, symmetric keys, hardware-embedded secrets, and so forth). As such, and as briefly mentioned, each of the secure platforms and/or health attestation services may have their own unique way of binding trust from the implicit trust that a challenger application has in the health attestation service used to then creating trust (on the part of the challenger application) in the quote, the secure platform, the report, and the target SMA.

Alternatively, instead of choosing the particular type of secure platform and/or health attestation service, the quoting SMA class may also allow the challenger application to simply not care which type of secure platform or which type of health attestation service is used. The quoting SMA class may thus provide sufficient flexibility to allow for remote attestation by the challenger application regardless of the identified types of either the secure platform or the health attestation service. In an example, the challenger application may simply request that the most readily available type of secure platform and/or type of health attestation service be used.

A particular quoting SMA may be instantiated with the purpose of performing remote attestation using a particular type of secure platform regardless of the particular type of health attestation service used. Alternatively, a particular quoting SMA may be instantiated with the purpose of performing remote attestation using a particular type of health attestation service regardless of the particular type of secure platform used. In some embodiments, a quoting SMA may be instantiated for the purpose of performing remote attestation using the particular type of secure platform and the particular type of health attestation service that are most readily available to the remote challenger 250.

Furthermore, in some embodiments, instantiation of a particular quoting SMA may comprise a single binary that is able to operate on different secure platforms and/or different health attestation services. In such cases, the particular quoting SMA may be able to detect the particular type of secure platform and/or health attestation service being used upon instantiation. In other embodiments, instantiation of a particular quoting SMA may comprise loading a specific version of the quoting SMA that is configured to operate on either or both of the particular type of secure platform that the given target SMA was created to execute upon, as well as the particular type of health attestation service to be used. Such instantiation may comprise a compile/link time choice that is transparent to a developer, but not transparent to the particular secure platform and/or particular health attestation service.

As further discussed herein, the quoting SMA class may create an abstraction that allows the challenger application 250 to remotely attest to a particular SMA (e.g., the target SMA 232) regardless of the type of secure platform or health attestation service used, as long as the challenger application trusts the health attestation service and the protocols used to bind trust in the integrity of the quote, the report, the secure platform, and the target SMA.

Figure 3:
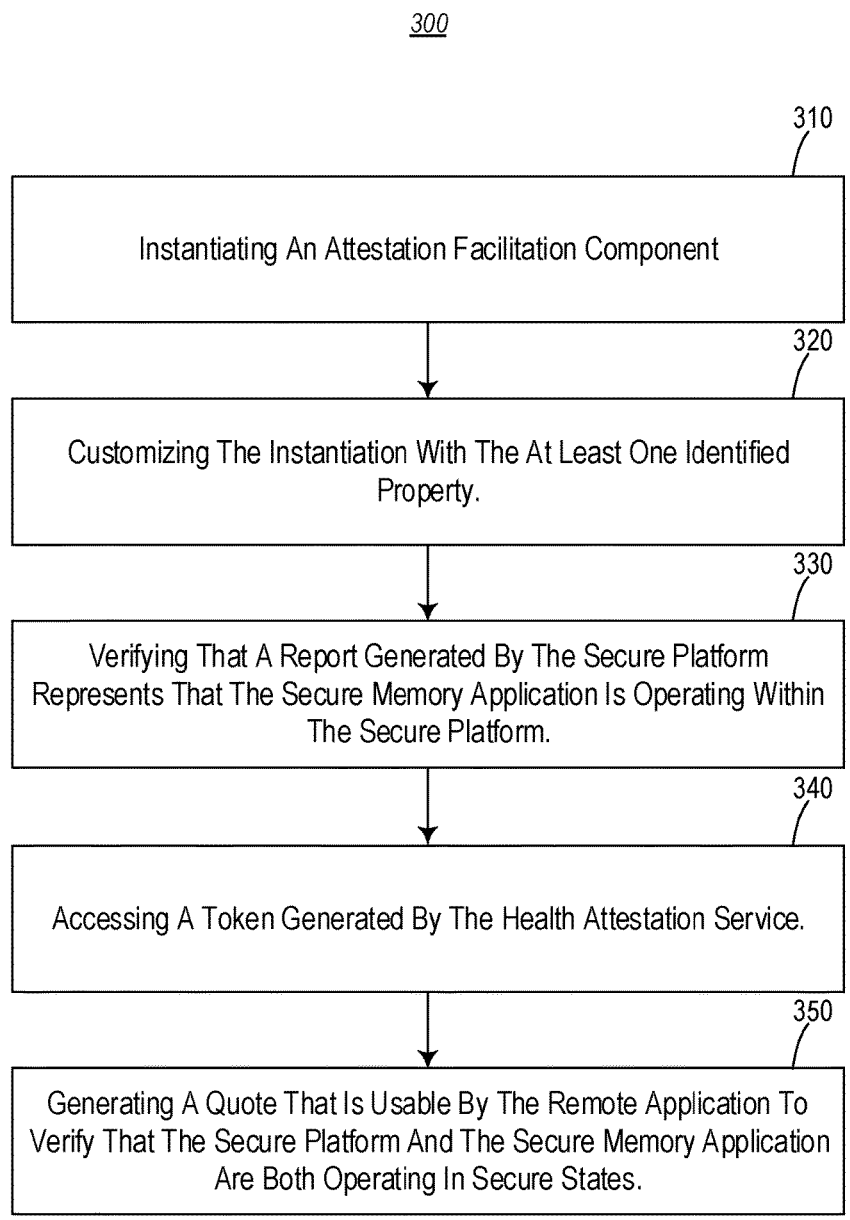
FIG. 3 illustrates a flowchart of a method for instantiating an attestation facilitation component that allows for remote attestation of a secure memory application regardless of a type of secure platform and/or a type of health attestation service.

FIG. 3 illustrates a method 300 for instantiating an attestation facilitation component (i.e., quoting SMA) that allows an application that is remote from the computer system to attest to a secure state of an SMA executing upon a secure platform of the computer system regardless of a type of the secure platform and a type of a health attestation service. Accordingly, the method 300 may be at least partially performed during a deployment time of quoting SMA 234. The method 300 may further be described with frequent reference to FIG. 2.

The method 300 includes instantiating an attestation facilitation component (Act 310). For example, quoting SMA 234 may be instantiated. Instantiation of the attestation facilitation component (i.e., quoting SMA 234) may comprise identifying at least one property that includes at least one of (i) the type of the secure platform from a plurality of different types of secure platforms and (ii) the type of the health attestation service from a plurality of different types of health attestation services. For instance, a type of the secure platform 220 may be identified, along with a particular type of the health attestation service 260.

The method 300 further includes customizing the instantiation with the at least one identified property (Act 320). In an example, if a particular hardware-based secure platform 220 were identified, the instantiated quoting SMA 234 may be customized according to the trust protocols (i.e., the way in which the particular secure platform binds trust in a verification of the secure platform's health) used by the particular hardware-based secure platform. The customized instance of the attestation facilitation component may then perform a number of actions including verifying that a report generated by the secure platform represents that the SMA is indeed running on the same secure platform that generated the report (Act 330). As such, the instantiated quoting SMA 234 may verify that a report generated with respect to a state of target SMA 232 is accurate and shows that the target SMA is executing within the secure platform. Accordingly, the quoting SMA does not necessarily determine whether or not the target SMA is healthy, the quoting SMA may simply verify that the target SMA is running on the secure platform that has been verified as healthy by the health attestation service. The challenger application is then responsible to ensure that the quote (and ultimately the report included within the quote) shows that the target SMA is indeed in a secure state.

The method 200 also includes accessing a token generated by the health attestation service (i.e., the customized instance of the attestation facilitation component performs the accessing) (Act 340). The generated token may represent that the secure platform is operating in a secure state. In an example, the instantiated quoting SMA 234 may gain access to a secure token generated by the health attestation service in response to the health attestation service finding that the secure platform is in a secure state. Additionally, as part of accessing the secure token, the quoting SMA may also gain access to a signing key that is part of the secure token.

The customized instance of the attestation facilitation component may then generate a quote that can be used by the remote application to verify that the secure platform and the SMA are both operating in secure states (Act 350). The quote may be based on at least a portion of the generated report and a portion of the generated token. Using the previous example, the quoting SMA may generate a quote that includes any critical measurements of the report and is signed using the signing key from the secure token. The quote may then be sent to the challenger application 260. The signature may then be validated by the challenger application using a public component of the signing key. Once the challenger application has verified that the quote has been signed by a source that the challenger application trusts (i.e., health attestation service), the challenger application may trust that the secure platform is healthy and that the measurements of the report contained in the quote are accurate. Accordingly, once the challenger application has ensured the accuracy of the report, the challenger application may determine whether the measurements of the report are satisfactory to the challenger application.

In some embodiments, the class of quoting SMA's may be provided as a middleware, software development kit (SDK), or application programming interface (API) that acts as an abstraction layer for the remote application and/or target SMA's with respect to the type of secure platform and/or health attestation service used. Creating such SDK's, API's, and so forth may allow developers of SMA's (i.e., target SMA's that are to be used by remote applications), challenger applications, and so forth, to more easily utilize different types of secure platforms and/or different types of health attestation services depending on what is available, as well as to seamlessly switch between types of secure platforms and/or types of health attestation services. Accordingly, such middleware may allow for more seamless remote attestation across various types of secure platforms, health attestation services, and the trust protocols associated with those secure platforms and health attestation services.

In this way, a class of quoting SMA's that can be customized based on the type of the secure platform and/or the type of health attestation service may allow target SMA's and challenger applications to utilize multiple different types of secure platforms and/or health attestation services instead of having to code different target SMA's and challenger applications for each particular type of secure platform and/or health attestation service. Additionally, such a class of customizable quoting SMA's may allow utilization of multiple types of health attestation services with a particular type of secure platform, as well as utilization of multiple types of a secure platform with a particular type of health attestation service. Accordingly, upon customization, an instantiated quoting SMA may be able to utilize each of the trust protocols used by the identified secure platform and/or identified health attestation service to bind the trust that the challenger application has in the health attestation service to trust in the generated quote, the secure platform, the report, and ultimately the target SMA.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
one or more processors; and
one or more computer-readable storage media having stored thereon computer-executable instructions that are executable by the one or more processors to cause the computer system to instantiate an attestation facilitation component that is enabled to provide verification to an application that is remote from the computer system of a secure state of a secure memory application (SMA) executing upon a secure platform of the computer system regardless of a type of the secure platform and a type of a health attestation service, the computer-executable instructions including instructions that are executable to cause the computer system to perform at least the following:
instantiate an attestation facilitation component;
identify at least one property including at least one of
(i) a particular type of the secure platform upon which the SMA is executing from a plurality of different types of secure platforms and
(ii) the type of the health attestation service from a plurality of different types of health attestation services;
customize the instantiation of the attestation facilitation component with the at least one identified property; and
the customized instance of the attestation facilitation component performing at least the following:
verifying that a report generated by the secure platform represents that the secure memory application is operating within the secure platform;
accessing a token generated by the health attestation service, the generated token representing that the secure platform is operating in a secure state; and
generating a quote that is usable by the remote application to verify that the secure platform and the secure memory application are both operating in secure states, the quote being based on at least a portion of the generated report and a portion of the generated token.

2. The computer system in accordance with claim 1, wherein both the type of the secure platform and the type of the health attestation service are identified.

3. The computer system in accordance with claim 1, wherein accessing the token comprises using the token to access a signing key.

4. The computer system in accordance with claim 3, wherein the signing key is used to sign the generated quote.

5. The computer system in accordance with claim 1, wherein the generated quote is sent to the remote application for verification that the secure platform and the secure memory application are both operating in secure states.

6. The computer system in accordance with claim 1, wherein the instantiated attestation facilitation component comprises an instance of a class of attestation facilitation component that is customizable to function with a plurality of secure platform types and a plurality of health attestation service types.

7. The computer system in accordance with claim 1, wherein the attestation facilitation component comprises a software development kit that acts as an abstraction layer for the remote application with respect to the type of at least one of the secure platform and the health attestation service.

8. A method, implemented at a computer system that includes one or more processors, for instantiating an attestation facilitation component that is enabled to provide verification to an application that is remote from the computer system of a secure state of a secure memory application (SMA) executing upon a secure platform of the computer system regardless of a type of the secure platform and a type of a health attestation service, comprising:
 instantiating an attestation facilitation component, the instantiation comprising:
  identifying at least one property including at least one of
   (i) a particular type of the secure platform upon which the SMA is executing from a plurality of different types of secure platforms and
   (ii) the type of the health attestation service from a plurality of different types of health attestation services;
  customizing the instantiation of the attestation facilitation component with the at least one identified property, the customized instance of the attestation facilitation component performing at least the following:
   verifying that a report generated by the secure platform represents that the secure memory application is operating within the secure platform;
   accessing a token generated by the health attestation service, the generated token representing that the secure platform is operating in a secure state; and
   generating a quote that is usable by the remote application to verify that the secure platform and the secure memory application are both operating in secure states, the quote being based on at least a portion of the generated report and a portion of the generated token.

9. The method in accordance with claim 8, wherein both the type of the secure platform and the type of the health attestation service are identified.

10. The method in accordance with claim 8, further comprising using the token to access a signing key.

11. The method in accordance with claim 10, wherein the signing key is used to sign the generated quote.

12. The method in accordance with claim 10, further comprising sending the quote to the remote application for verification that the secure platform and the secure memory application are both operating in secure states.

13. The method in accordance with claim 12, wherein the instantiated attestation facilitation component comprises an instance of a class of attestation facilitation component that is customizable to function with a plurality of secure platform types and a plurality of health attestation service types.

14. The method in accordance with claim 13, wherein the attestation facilitation component comprises a software development kit that acts as an abstraction layer for the remote application with respect to the type of at least one of the secure platform and the health attestation service.

15. A computer program product comprising one or more hardware storage devices having stored thereon computer-executable instructions that are executable by one or more processors of a computer system to instantiate an attestation facilitation component that is enabled to provide verification to an application that is remote from the computer system of a secure state of a secure memory application (SMA) executing upon a secure platform of the computer system regardless of a type of the secure platform and a type of a health attestation service, the computer-executable instructions including instructions that are executable to cause the computer system to perform at least the following:
 instantiate an attestation facilitation component;
 identify at least one property including at least one of
  (i) a particular type of the secure platform upon which the SMA is executing from a plurality of different types of secure platforms and
  (ii) the type of the health attestation service from a plurality of different types of health attestation services;
 customize the instantiation of the attestation facilitation component with the at least one identified property; and
 the customized instance of the attestation facilitation component performing at least the following:
  verifying that a report generated by the secure platform represents that the secure memory application is operating within the secure platform;
  accessing a token generated by the health attestation service, the generated token representing that the secure platform is operating in a secure state; and
  generating a quote that is usable by the remote application to verify that the secure platform and the secure memory application are both operating in secure states, the quote being based on at least a portion of the generated report and a portion of the generated token.

16. The computer program product in accordance with claim 15, wherein both the type of the secure platform and the type of the health attestation service are identified.

17. The computer program product in accordance with claim 15, wherein accessing the token comprises using the token to access a signing key.

18. The computer program product in accordance with claim 17, wherein the signing key is used to sign the generated quote.

19. The computer program product in accordance with claim 15, wherein the generated quote is sent to the remote application for verification that the secure platform and the secure memory application are both operating in secure states.

20. The computer program product in accordance with claim 15, wherein the instantiated attestation facilitation component comprises an instance of a class of attestation facilitation component that is customizable to function with a plurality of secure platform types and a plurality of health attestation service types.

* * * * *